(12) United States Patent
Rodriguez et al.

(10) Patent No.: US 7,093,607 B2
(45) Date of Patent: Aug. 22, 2006

(54) METHODS AND APPARATUS FOR MAINTAINING PRESSURE GAIN IN A SERVOVALVE ASSEMBLY

(75) Inventors: Mario Armando Rodriguez, Camarillo, CA (US); Ronald Olson, Mission Hills, CA (US); Torin Lewis, Bellflower, CA (US)

(73) Assignee: HR Textron, Inc., Santa Clarita, CA (US)

( * ) Notice: Subject to any disclaimer, the term of this patent is extended or adjusted under 35 U.S.C. 154(b) by 85 days.

(21) Appl. No.: 10/806,848

(22) Filed: Mar. 23, 2004

(65) Prior Publication Data

US 2006/0000507 A1    Jan. 5, 2006

(51) Int. Cl.
    *F15B 13/044* (2006.01)

(52) U.S. Cl. .............................. 137/15.18; 137/625.62; 137/625.63; 137/625.69

(58) Field of Classification Search ........... 137/625.62, 137/625.63, 625.69
    See application file for complete search history.

(56) References Cited

U.S. PATENT DOCUMENTS

| | | | | |
|---|---|---|---|---|
| 2,824,574 A | * | 2/1958 | Place ..................... | 137/625.62 |
| 2,920,650 A | * | 1/1960 | Moog, Jr. ............... | 137/625.69 |
| 2,987,050 A | * | 9/1961 | Oppenheimer et al. | 137/625.69 |
| 3,029,830 A | * | 4/1962 | Klover et al. .......... | 137/625.62 |
| 3,228,423 A | * | 1/1966 | Moog, Jr. ............... | 137/625.62 |
| 4,244,398 A | | 1/1981 | Tengan .................. | 137/630.19 |
| RE31,657 E | | 9/1984 | Caruso .................... | 91/375 R |
| 4,800,924 A | | 1/1989 | Johnson ................. | 137/625.23 |
| 5,285,715 A | | 2/1994 | Elrod, Jr. et al. ............. | 91/361 |
| 5,551,481 A | | 9/1996 | Elrod, Jr. ................ | 137/625.65 |
| 5,597,014 A | | 1/1997 | Vick ...................... | 137/625.23 |

* cited by examiner

*Primary Examiner*—Ramesh Krishnamurthy
(74) *Attorney, Agent, or Firm*—BainwoodHuang; David E. Huang, Esq.

(57) ABSTRACT

A servovalve has a sleeve having both a first metering aperture and a second metering aperture in fluid communication with a single port cavity defined by the servovalve. A spool oriented within the sleeve has a first land and a second land and defines a channel oriented between the first land and the second land. When the spool orients in a null position within the sleeve, the first land overlaps the first metering aperture and the second land overlaps the second metering aperture. As a low viscosity fluid within the servovalve assembly leaks across the first land and enters the channel, the overlap of the first and second lands with the first and second metering apertures minimizes flow of the fluid from the channel into the port cavity associated with the metering apertures. The configuration of the sleeve assembly, therefore, maintains a relatively large pressure gain within the servovalve assembly.

20 Claims, 4 Drawing Sheets

METHODS AND APPARATUS FOR MAINTAINING PRESSURE GAIN IN A SERVOVALVE ASSEMBLY

BACKGROUND

Conventional servovalves convert relatively low power electrical control input signals into a relatively large mechanical power output. Certain servovalves, such as fuel control servovalves utilized in aircraft, use aircraft engine fuel as the pressurized fluid that controls a corresponding fluid motor. For example, during operation pressurized aircraft fuel enters the fuel control servovalve and, based upon the control input signals, drives the fluid motor to operate nozzles and other variable-geometry elements associated with the aircraft.

FIG. 1 illustrates an example of a conventional fuel control servovalve 10, such as a jet pipe servovalve. The typical jet pipe servovalve 10, for example, includes a housing 12 having a sleeve 24, a spool 26 disposed within the sleeve 24, a motor 21 coupled to the spool 26 via a feedback spring 23, a fluid jet 25 associated with the motor 21, and a fluid receiver 27. When the motor 21 receives an input signal, the motor causes the spool 26 to meter fluid flow between a pressurized fluid source 20 and a hydraulic or fluid motor 33 coupled to the servovalve 10.

Servovalve spools 26 typically have lands 28 that meter fluid flow within the servovalve 10 between the fluid source 20 and the fluid motor 32. Each land 28 of the spool 26 has an outer diameter that is smaller than an inner diameter of the sleeve 24. The lands 28, therefore, form a gap or clearance with an inner surface of the sleeve 24 that allows the spool 26 to translate within the sleeve 24 and minimizes potential binding of the spool 26 within the sleeve 24 during actuation. Typically, spools 26 have several lands 28 arranged in pairs or sets. Each pair of lands 28 of a conventional spool 26 defines a control channel or control groove 32 oriented between adjacent lands 28-1, 28-2 of the pair. The control channel 32 helps to equalize pressure within the sleeve 24 and spool 26 allowing the spool 26 to actuate relatively smoothly within the sleeve 24.

Assume the servovalve 10 is configured in a pressurized state where a fluid flows from the fluid source 20, through a conduit 22, and into the sleeve 24. When the spool 26 positions in a null or closed position within the sleeve 26, as shown in FIG. 1, a pair of lands 28, along with the associated control channel 32, cover an associated, rectangularly shaped port 30 oriented between the fluid source 20 and the fluid motor 33. In the null position, the lands 28-1, 28-2 of the spool 26 (e.g., outer edges of the lands 28-1, 28-2) prevent or minimize fluid flow between the fluid source 20 and the fluid motor 33 via the port 30.

During operation, the motor receives a control signal from a control signal source and, in response, causes the spool 26 to actuate or move within the sleeve 24 to an open position such that the pair of lands 28 offsets from (e.g., uncovers) the rectangularly shaped port 30. For example, when the servovalve 10 orients the spool 26 in a null position, the jet 25 impinges receiver openings 29 defined by the fluid receiver 27. When the motor 21 receives an input signal, the motor 21 diverts the jet 25 such that the jet 25 substantially impinges one of the receiver openings 29, thereby increasing a pressure within a channel 31 (e.g., one of a pair of channels 31) associated with the impinged receiver opening 29. The pressure differential on the spool 26 causes the spool 26 to actuate in the sleeve 24 to an open position. In the open position, the set of lands 28 meters an amount of fluid flowing between the fluid source 20 and the fluid motor 33 to control positioning or movement of a load coupled to the fluid motor 33. As the spool 26 moves in response to the input signal, the spool generates an opposing torque on the feedback spring 23 that returns the fluid jet 25 to a substantially centered position and creates a force balance across the spool 26, thereby bringing the spool 26 to a position of positional equilibrium.

SUMMARY

The configuration of metering ports on conventional servovalves, however, suffers from a variety of deficiencies.

As indicated above, certain servovalves use engine fuel from a fluid source to operate an associated mechanical system, such as a hydraulic motor. Fuel, however, has a relatively low viscosity. For example, at a temperature of approximately 20° C., the dynamic viscosity of fuel is less than approximately 2.0 centistokes or below. Pressurized fluid at such a relatively low viscosity typically leaks within a gap or clearance formed between a sleeve and the lands of a spool disposed within the sleeve.

As indicated above, with respect to FIG. 1, when a pair of lands 28-1, 28-2 cover an associated, rectangularly shaped port in a null position, the lands 28-1, 28-2 prevent fluid flow between the fluid source 20 and the fluid motor 32 via the port 30. For low viscosity pressurized fluid, such as fuel, however, the pressurized, low viscosity fluid typically leaks 40 past the pair of lands 28. For example, the fluid leaks 40-1 past the first land 28-1, through a control channel 32, and further leaks 40-2 across the second land 28-2 into a return chamber 34. Such leakage of fluid past the lands 28-1, 28-2 is termed cross-port leakage.

When the spool 26 orients at the null position, cross-port leakage within the servovalve assembly 10 is substantially greater than leakage levels controlled by the lands 28. In the conventional servovalve assembly 10, therefore, the use of a pair of lands 28 defining a control channel 32 in conjunction with a single, associated port 30 limits the ability for the servovalve assembly 10 to control fluid pressure at the ports 30 For example, in a conventional servovalve assembly 10, when the spool 26 orients in the null position, the channel 32 aligns with the port 30 such that the channel 32 forms a fluid communication path with the port 30 that allows fluid to flow into the port 30. In such an orientation, as a pressurized, low viscosity fluid leaks 40-1 past the first land 28-1 into the channel 32, the channel 32 directs a portion of the fluid through the first port 30 where the fluid attempts to exit the servovalve assembly 10. The fluid in turn, flows through the channel 32, past the second land 28-2 and exits the servovalve assembly 10 through a return port 36. Such fluid leakage reduces the pressure gain (e.g., lowers a pressure differential) between the first port 30 and the second port 50 such that a differential pressure within the fluid motor 33 is substantially reduced. The reduction in pressure gain within the assembly 10 can reduce the performance of the fluid motor 33 by leading to imprecise positioning of a load attached to the fluid motor 33.

By contrast, embodiments of the present invention significantly overcome the described deficiencies and provide mechanisms for maintaining a higher pressure gain within a servovalve assembly. A servovalve has a sleeve having both a first metering aperture and a second metering aperture in fluid communication with a single port cavity defined by the servovalve. A spool oriented within the sleeve has a first land and a second land and defines a channel oriented between the first land and the second land. When the spool orients in a null position within the sleeve, the first land overlaps the first metering aperture and the second land overlaps the second metering aperture. As a low viscosity fluid within the servovalve assembly leaks across the first land and enters the channel, the overlap of the first and second lands with the first and second metering apertures minimizes flow of the fluid from the channel into the port cavity associated with the metering apertures. The configuration of the sleeve and spool, therefore, enhances or maintains a pressure gain within the servovalve assembly.

In one arrangement, a servovalve assembly has a housing, defining a port, and a sleeve assembly having a sleeve and a spool. The sleeve defines a bore, a first metering aperture, and a second metering aperture. The sleeve also has a blocking element oriented between the first metering aperture and the second metering aperture. Both the first metering aperture and the second metering aperture lead to the port defined by the housing. The spool is disposed within the bore defined by the sleeve. The spool has a first land and a second land where the first land and the second land define a channel oriented between the first land and the second land. The servovalve assembly has a motor coupled to the housing where the motor is configured to position the spool, within the bore, in a substantially null position. In such a position, the first land substantially covers the first metering aperture, the second land substantially covers the second metering aperture, and the blocking element substantially covers the channel to minimize flow of a fluid from the channel to the port. In such an arrangement, the sleeve assembly minimizes flow of fluid, held within the channel, into the port, thereby maintaining a relative higher pressure gain within the servovalve assembly between a fluid source and a fluid motor, compared to conventional servovalve assemblies. By maintaining such a pressure gain, the configuration of the sleeve assembly allows the fluid motor to accurately position a load coupled to the fluid motor during operation of the servovalve assembly.

In one arrangement, the first land defines a first land width and the channel oriented between the first land and the second land defines a channel width, the first land width being greater than the channel width and being configured to overlap at least a portion of the blocking element when the motor orients the bore in a substantially null position. Additionally, the second land defines a second land width and the channel oriented between the first land and the second land defines the channel width, the second land width being greater than the channel width and being configured to overlap at least a portion of the blocking element when the motor orients the bore in a substantially null position. The relative difference between the widths of the first and second lands and the width of the channel minimizes an amount or volume of fluid that leaks into the channel past the first land and minimizes an amount of fluid that leaks from the channel, past the second land, and into a return chamber (e.g., minimizes cross-port leakage). Such a configuration, therefore, aids in maintaining a higher pressure gain between a fluid source and a fluid motor.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention provide mechanisms for enhancing or maintaining pressure gain within a servovalve assembly. A servovalve has a sleeve having both a first metering aperture and a second metering aperture in fluid communication with a single port cavity defined by the servovalve. A spool oriented within the sleeve has a first land and a second land and defines a channel oriented between the first land and the second land. When the spool orients in a null position within the sleeve, the first land overlaps the first metering aperture and the second land overlaps the second metering aperture. As a low viscosity fluid within the servovalve assembly leaks across the first land and enters the channel, the overlap of the first and second lands with the first and second metering apertures minimizes flow of the fluid from the channel into the port cavity associated with the metering apertures. The configuration of the sleeve assembly, therefore, maintains a relatively higher pressure gain within the servovalve assembly.

Figure 2:
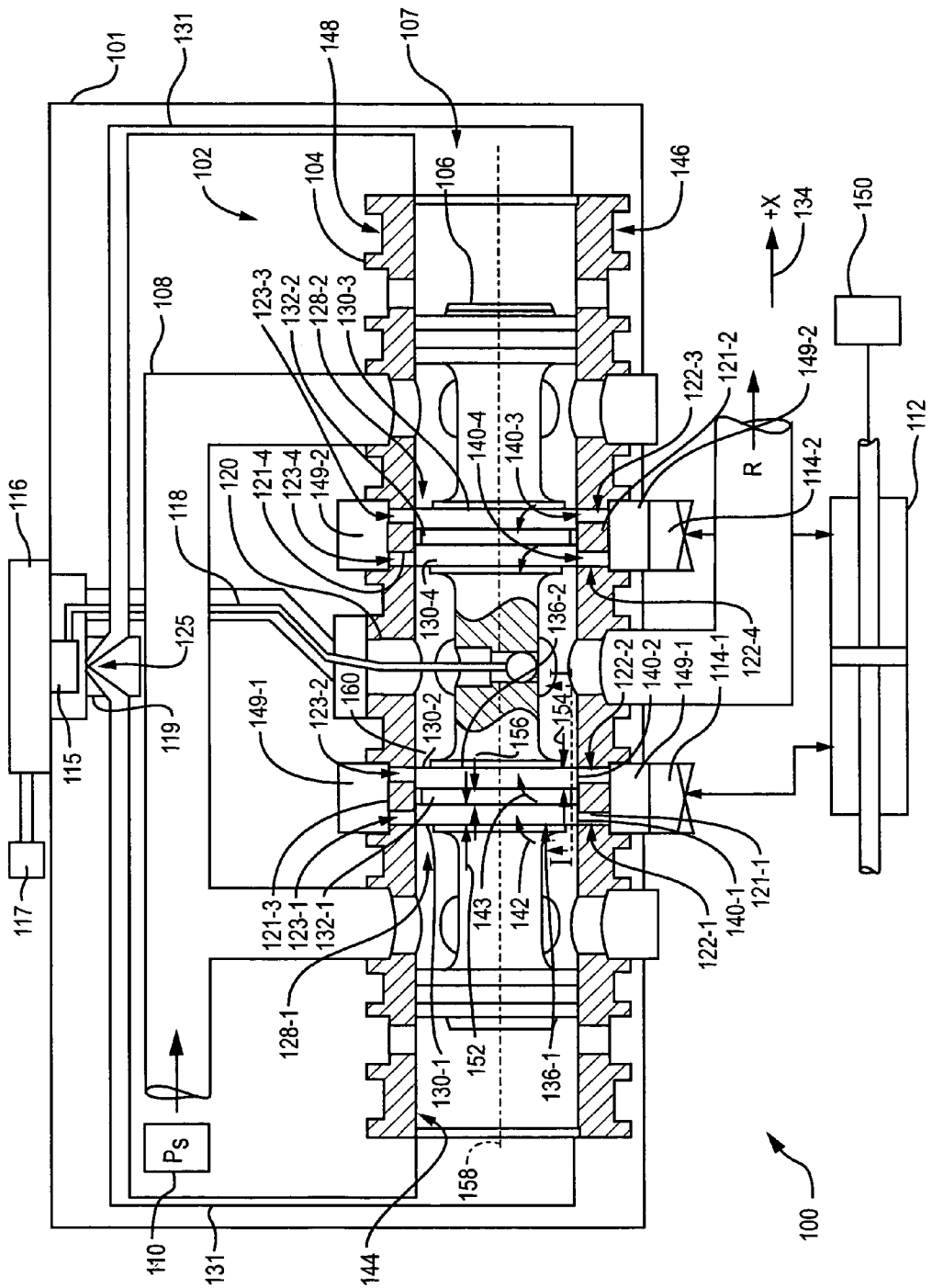
FIG. 2 illustrates a servovalve assembly, according to one embodiment of the invention.

FIG. 2 illustrates an example of a servovalve assembly 100, such as a jet pipe fuel control servovalve, having a housing 101 and a sleeve assembly 102. The sleeve assembly 102 includes a sleeve 104 and a spool 106 disposed within a bore 107 defined by the sleeve 104. In certain arrangements, the servovalve assembly 100 may be configured as a four-landed four-way critical-center servovalve, as shown.

The housing 101 defines an input conduit 108 that couples between a fluid source 110 and the sleeve 104. In one arrangement, the fluid source 110 provides a relatively low viscosity fluid, such as aircraft engine fuel, under pressure, to the servovalve assembly 100. For example, in such an arrangement, the dynamic viscosity of the fluid is less than approximately 2.0 centistokes In one arrangement, the fluid source 110 provides the relatively low viscosity fluid to the servovalve assembly 100 at a flow rate of less than approximately 0.8 gallons per minute (GPM) and at a pressure differential, relative to a fluid motor 112, for example, of approximately less than 300 pounds per square inch (psi).

The housing 101 further defines a first port (e.g., first port cavity) 114-1 and a second port (e.g., second port cavity) 114-2, each in fluid communication with the sleeve 104 and the fluid motor 112. The housing 101 carries a motor 116 that couples to the spool 106 via a feedback spring 118. The motor 116 is configured to receive control signals from a control signal source 117. In response to the control signals, the motor 116 diverts a jet 115 such that the jet 115 substantially impinges a receiver opening 125, thereby increasing a pressure within one of a pair of channels 131 associated with the impinged receiver opening 29. The pressure differential on the spool 106 causes the spool 106 to actuate in the sleeve 104, thereby controlling flow between the fluid source 110 and the fluid motor 112.

The sleeve 104 defines metering apertures 122 configured to aid in metering fluid flow from the fluid source 110, via the input conduit 108, to the fluid motor 112. As illustrated, the sleeve 104 defines a first metering aperture 122-1, a second metering aperture 122-2, a third metering aperture 122-3, and a fourth metering aperture 122-4 oriented along a lower edge of the sleeve 104. Additionally, the sleeve 104 defines metering apertures 123-1 through 123-4 oriented along an upper edge 148 of the sleeve 104, for example. The sleeve 104 also includes a sleeve element or blocking element 121 between adjacent apertures 122. For example, a first sleeve element 121-1 positions between the first metering aperture 122-1 and the second metering aperture 122-2 oriented along the lower edge 146 of the sleeve 104 and a second sleeve element 121-2 positions between the third metering aperture 122-3 and the fourth metering aperture 122-4 oriented along the lower edge 146 of the sleeve 104. Also, a third sleeve element 121-3 positions between the first metering aperture 123-1 and the second metering aperture 123-2 oriented along the upper edge 148 of the sleeve 104 and a fourth sleeve element 121-4 positions between the third metering aperture 123-3 and the fourth metering aperture 123-4 oriented along the upper edge 148 of the sleeve 104.

The apertures 123-1, 123-2, 122-1, and 122-2 provide fluid communication with a first annular flow passage or groove 149-1 oriented between the sleeve 104 and the housing 101 relative to a long axis 158 of the bore 107. The flow passage 149-1, in turn, provides fluid communication between the sleeve 104 and the first port cavity or first control line 114-1. The apertures 123-3, 123-4, 122-3, and 122-4 provide fluid communication with a second annular flow passage or groove 149-2 oriented between the sleeve 104 and the housing 101 relative to the long axis 158 of the bore 107. The flow passage 149-2, in turn, provides fluid communication between the sleeve 104 and the second port cavity or second control line 114-2. The first metering apertures 122-1, 123-1 and the second metering apertures 122-2, 123-2, therefore, lead to (e.g., provide fluid communication with) the first port cavity 114-1 and the third metering apertures 122-3, 123-3 and the fourth metering apertures 122-4, 123-4, therefore, lead to (e.g., provide fluid communication with) the second port cavity 114-2. In such an arrangement, the first metering apertures 122-1, 123-1 and the second metering apertures 122-2, 123-2 aid in metering fluid flow through the first port cavity 114-1 while the third metering apertures 122-3, 123-3 and the fourth metering apertures 122-4, 123-4 aid in metering fluid flow through the second port cavity 114-2.

The spool 106 is configured as having lands 130 arranged in sets or pairs 128. For example, a first land 130-1 and a second land 130-2 arrange into a first set of lands 128-1 and a third land 130-3 and a fourth land 130-4 arrange into a second set of lands 128-2. As shown in FIG. 2, the first set of lands 128-1 corresponds to the first port cavity 114-1 and, during operation, aids in metering fluid, from the fluid source 110, through the metering apertures 122-1, 122-2 to the first port cavity 114-1. Also as shown, the second set of lands 128-2 corresponds to the second port cavity 114-2 and, during operation, aids in metering fluid, from the fluid source 110, through the metering apertures 122-3, 122-4 to the second port cavity 114-2. The spool 106 also defines control channels 132-1, 132-2 (e.g., control grooves) oriented between the first land 130-1 and the second land 130-2 and between the third land 130-3 and the fourth land 130-4, respectively. The control channels 132-1, 132-2 aid in equalizing pressure within the bore 107 and allow the spool 106 to actuate relatively smoothly within the bore 107 defined by the sleeve 104.

Prior to operation of the servovalve assembly 100, the motor 116 (e.g., or an assembler) orients the spool 106 in a substantially null or closed position within the sleeve 104, as shown in FIG. 2.

Figure 3:
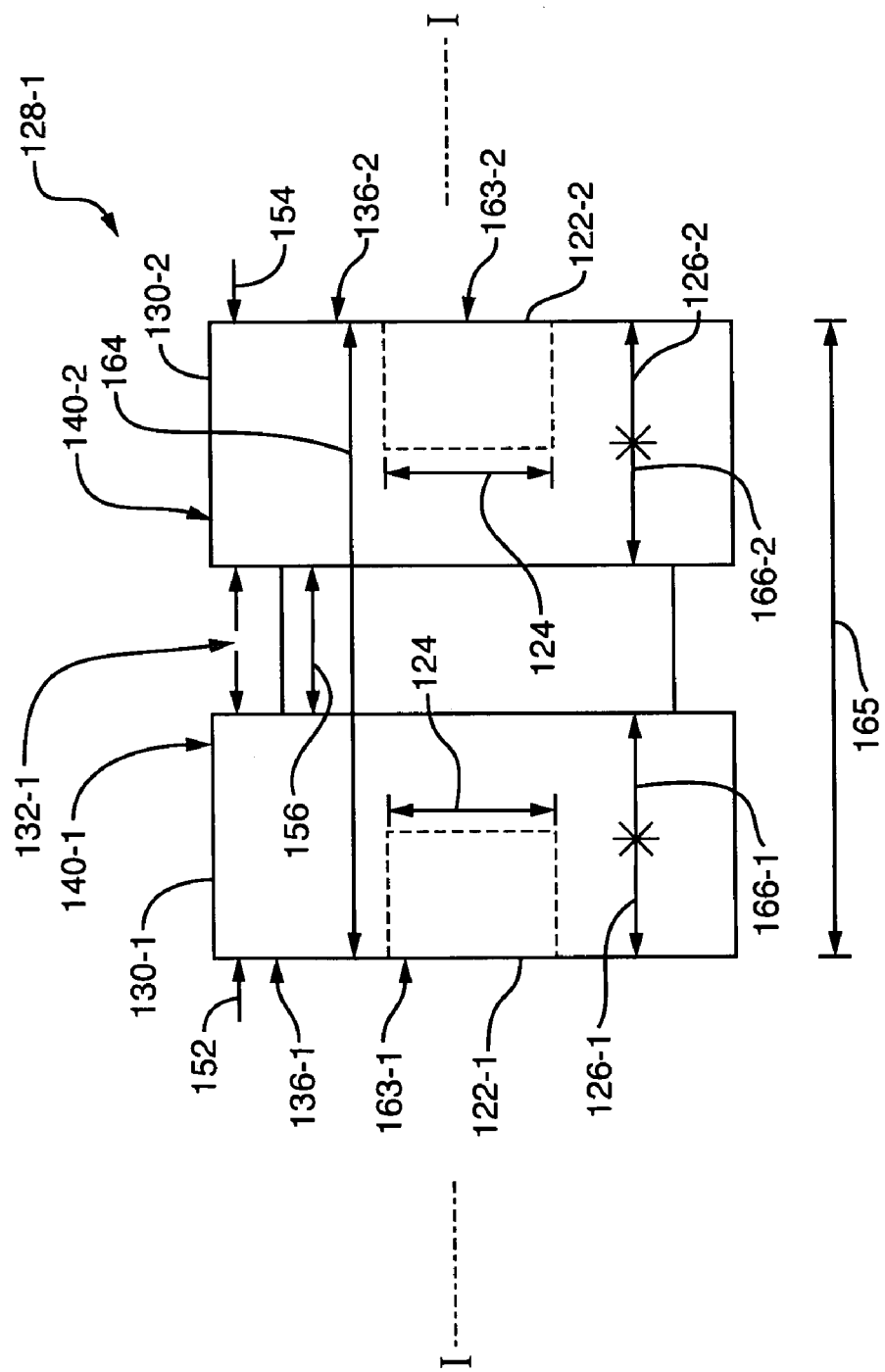
FIG. 3 illustrates a geometric configuration of the lands and the metering apertures defined by the servovalve assembly shown in FIG. 2, according to one embodiment of the invention.

FIG. 3 illustrates, as the spool 106 positions in a substantially null position, orientation of the lands 130-1, 130-2 (e.g., the first set of lands 128-1) relative to the corresponding apertures 122-1 and 122-2 taken along section I—I, as shown in FIG. 2. In one arrangement, each of the apertures 122-1, 122-2, has a corresponding length 124-1, 124-2 of approximately 0.010 inches and a corresponding width 126-1, 126-2 of approximately 0.020 inches. The land set 128-1 defines a land set length 165 between the metering edges 136-1, 136-2 of the lands 130-1, 130-2. The apertures 122-1, 122-2 position on the sleeve 104 such that a distance 164 between an outer edge 163-1 of the first aperture 122-1 and an outer edge 163-2 of the second aperture 122-2 defines a length 164 substantially equal to the land set length 165.

Returning to FIG. 2, as the spool 106 positions in the null position, the first land 130-1 (e.g., a face 140-1 of the first land 130-1) covers the first metering aperture 122-1 such that an outer edge 136-1 of the first land 130-1 aligns with an outer edge 163-1 of the first metering aperture 122-1 and the second land 130-2 (e.g., a face 140-2 of the second land 130-2) covers the second metering aperture 122-2 such that an outer edge 136-2 of the second land 130-2 aligns with an outer edge 163-2 of the second metering aperture 122-2. Also in the null position, the control channel 132-1 aligns with the blocking element 121-1 of the sleeve 104 such that the blocking element 121-1 covers the control channel 132-1. With the lands 130 of the spool 106 covering the respective metering apertures 122 and the blocking elements 121 covering the respective control channels 132, the sleeve assembly 102 minimizes flow of fluid, held within the channels 132, into a corresponding port cavity 114. By minimizing such flow, the configuration of the sleeve assembly 102 maintains a relatively higher (e.g., larger) pressure gain within the servovalve assembly 100 (e.g., between a fluid source 110 and a fluid motor 112) compared to conventional servovalve assemblies.

For example, with respect to the first set of lands 128-1, for a pressurized, low viscosity fluid (e.g., from the fluid source 110), when the spool 106 engages the null position, the fluid leaks 142 between the first land 130-1 (e.g., the outer edge 140-1 of the first land 130-2) and an inner surface 144 of the sleeve 104. As the fluid leaks 142 (e.g., via cross-port leakage), the fluid enters the channel 132-1 oriented between the first land 130-1 and the second land 130-2. Because the lands 130-1, 130-2 cover the respective metering apertures 122-1, 122-2 and because the blocking element 121-1 covers the control channel 132-1, the sleeve assembly 102 minimizes the ability for the fluid within the channel 132-1 to flow into the metering apertures 122-1, 122-2 and the associated port cavity 114-1 to decrease a pressure gain between the fluid source 110 and the fluid motor 112.

In the configuration of the sleeve assembly 102 as illustrated in FIG. 2, the lands 130-1, 130-2 control pressure levels within the servovalve assembly 100 at the metering apertures 122-1, 122-2. The positioning of the lands 130 relative to the metering apertures 122 and the positioning of the blocking elements 121 relative to the respective control channels 132 (e.g., the configuration of the sleeve assembly 102), therefore, maintains a higher pressure gain between the fluid source 110 and the fluid motor 112 when the spool 106 orients in a null position. By maintaining such a pressure gain, the configuration of the sleeve assembly 102 provides the fluid motor 112 with an increased accuracy in positioning a load 150 coupled to the fluid motor 112, compared to conventional servovalves.

Returning to FIG. 3, in one arrangement, the widths of the lands 130-1, 130-2 relative to the widths of the apertures 122-1, 122-2 and the control channel 132-1 also aids in minimizing leakage within the servovalve assembly 10. For example, each land 130-1, 130-2 defines a respective land width 152, 154. Each land width 152, 154 is greater than the widths 126-1, 126-2 of the respective apertures 122-1, 122-2 and is greater than an associated channel width 156. By forming the widths 152, 154 of the first and second lands 130-1, 130-2 larger than the width 156 of the channel 132-1, a manufacturer provides a relatively large amount of overlap between the first land 130-1 and the blocking portion 121-1 (e.g., an overlap width 166-1) and between the second land 130-2 and the blocking portion 122-2 (e.g., an overlap width 166-2).

For example, returning to FIG. 2, as the spool 106 positions in the null position and the first land 130-1 (e.g., a face 140-1 of the first land 130-1) covers the first metering aperture 122-1 (e.g., the outer edge 136-1 of the first land 130-1 aligns with the outer edge 163-1 of the first metering aperture 122-1), the overlap width 166-1 of the first land 130-1 covers or overlaps blocking element 121-1 of the sleeve 104. Also in the null position, the second land 130-2 (e.g., a face 140-2 of the second land 130-2) covers the second metering aperture 122-2 such that an outer edge 136-2 of the second land 130-2 aligns with an outer edge 163-2 of the second metering aperture 122-2 and the overlap length 166-2 of the second land 130-2 covers the blocking element 121-2 of the sleeve 104. Overlap between the first land 130-1 and the blocking portion 121-1 and between the second land 130-2 and the blocking portion 121-1 minimizes fluid communication between the channel 132-1 and either the first metering aperture 122-1 or the second metering aperture 122-2 and, therefore, minimizes flow of fluid held within the channel 132-1 (e.g., via cross-port leakage) into the port cavity 114-1. By minimizing such flow, the sleeve assembly 102 minimizes a decrease in a pressure gain between the fluid source 110 and the fluid motor 112. The described configuration of the widths 152, 154 of the first and second lands 130-1, 130-2 relative to the width 156 of the channel 132-1, therefore, aids in maintaining a higher pressure gain within the servovalve assembly 100.

Additionally, by forming the widths 152, 154 of the first and second lands 130-1, 130-2 larger than the width 156 of the channel 132-1, a manufacturer minimizes an amount or volume of fluid that leaks 142 into the channel 132-1 past the first land 130-1 and minimizes an amount of fluid that leaks 143 from the channel 132-1, past the second land 130-2, and into a return chamber 160 (e.g., minimizes cross-port leakage). With a decreased amount of cross-port leakage occurring between the sleeve 104 and the lands 130 of the spool 106, metering edges 136 associated with the lands 130 predominantly control a flow of fluid into the port cavities 114 and maintain a relatively large pressure gain at the fluid motor 112 during operation under load.

For example, assume the motor 116 causes the spool 106 to actuate along a long axis 158 of the sleeve 104 in a +x-direction 134 to an open position to allow fluid flow between the fluid source 110 and the fluid motor 112 through the ports 114. During actuation, a metering edge 136-1 of the first land 130-1 displaces past the first metering aperture 122-1 to allow fluid flow from the fluid source 110, through the port cavity 114-1, and into the fluid motor 112. Also during actuation (e.g., in the open position), the control channel 132-1 aligns with the second metering aperture 122-2, thereby allowing any fluid within the control channel 132-1 to flow into the port cavity 114-1. Because the widths 152, 154 of the first and second lands 130-1, 130-2, respectively, are configured larger than the width 156 of the channel 132-1 to minimize cross-channel flow, a minimal (e.g., negligible) amount of fluid leaks 142 into the channel 132-1 past the first land 130-1. As the channel 132-1 aligns with the second metering aperture 122-1 the relatively minimal amount of fluid enters the port cavity 114-1. Because the amount of fluid is relatively minimal, such flow from the channel 132-1 to the port cavity 114-1 does not substantially affect the pressure gain between the fluid source 110 and the fluid motor 112. Therefore, during operation, the metering edge 136-1 of the first land 130-1 substantially controls the amount of flow into the port cavity 114-1 and aids in maintaining a relatively large pressure gain at the fluid motor 112 during operation under load.

Figure 1:
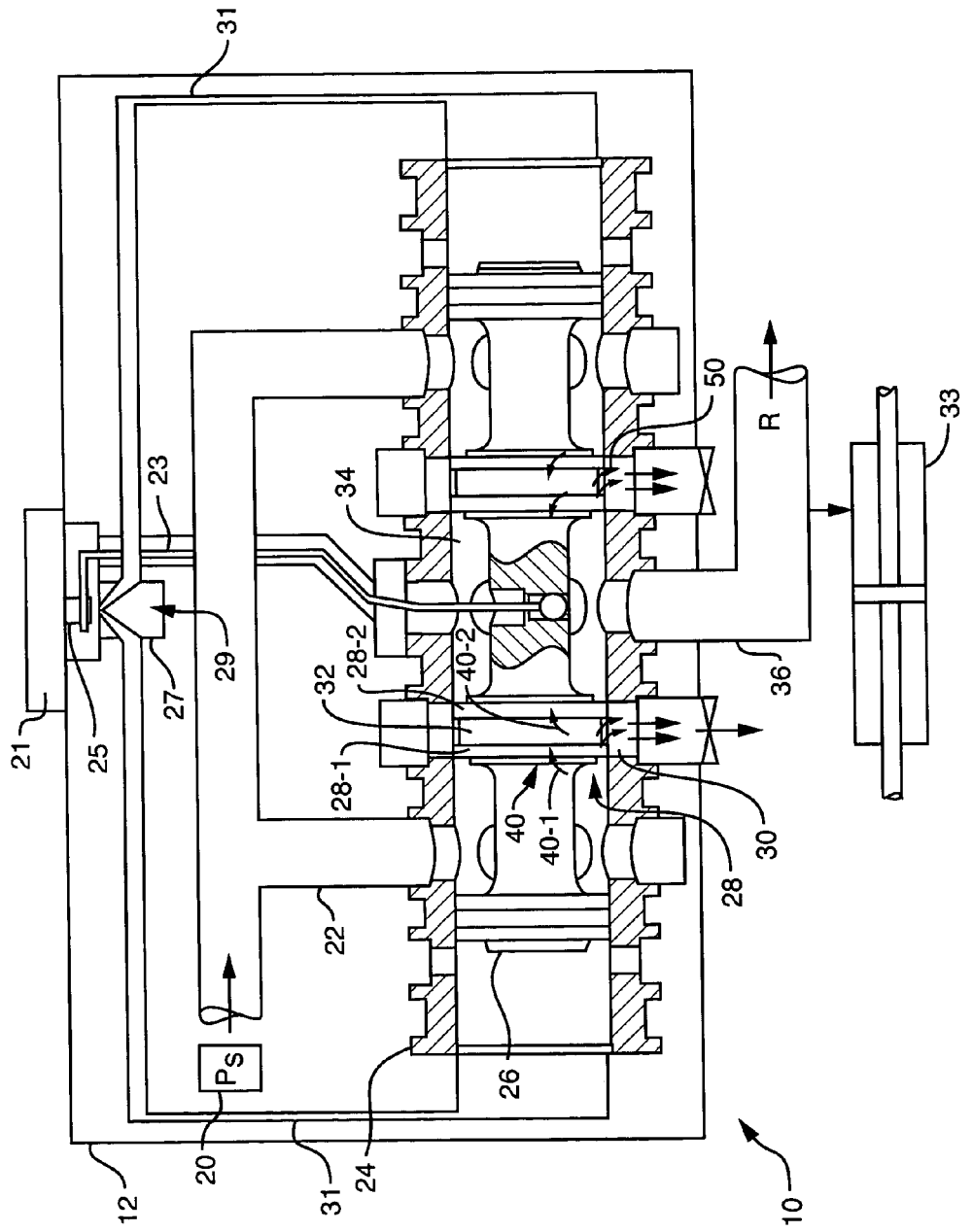
FIG. 1 is a schematic view of a prior art servovalve assembly.
Figure 4:
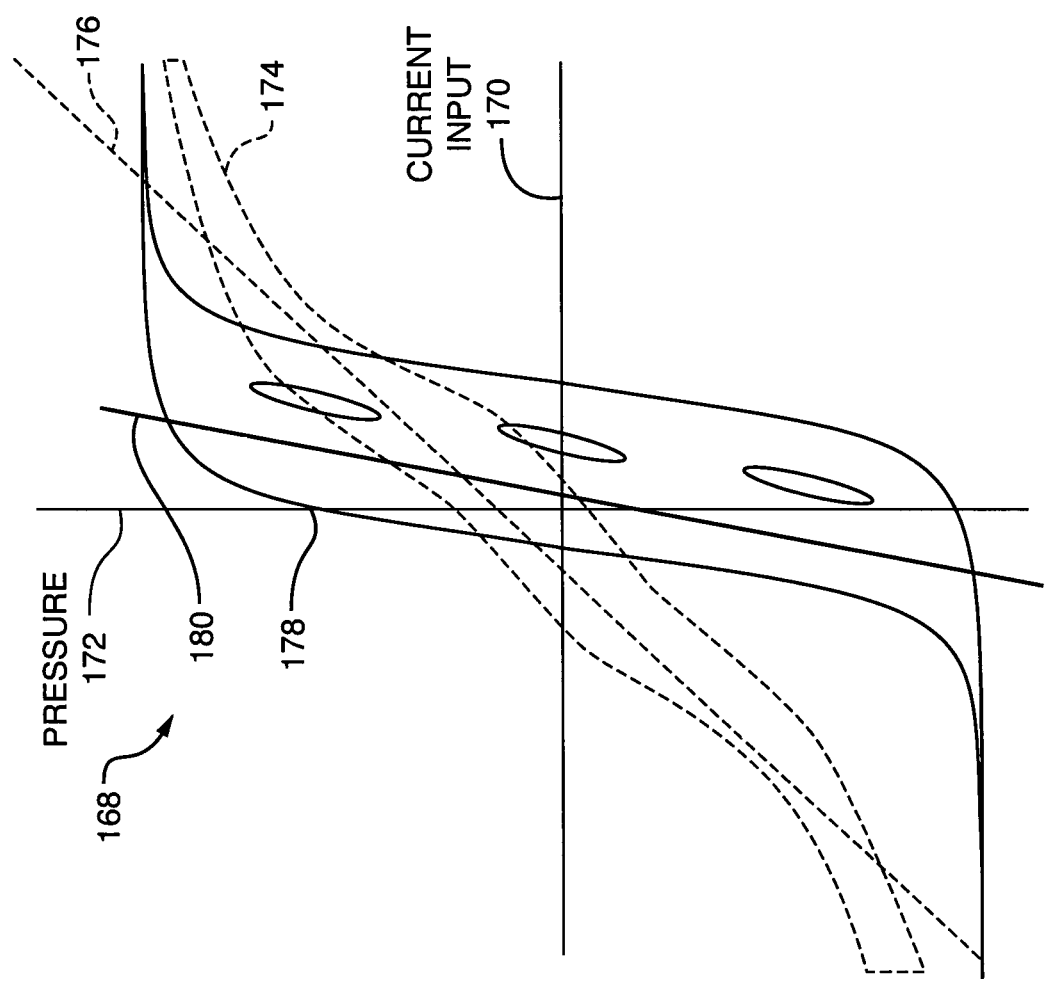
FIG. 4 is a graph showing pressure gain performances of a conventional servovalve assembly and the servovalve assembly shown in FIG. 2.

FIG. 4 is a graph 168 illustrating pressure gain for a conventional servovalve assembly, such as illustrated by FIG. 1, and for the servovalve assembly 100, such as shown in FIG. 2. The graph 168 plots, along an x-axis 170, current input to a servovalve assembly (e.g., a current input from the controller to the motor of the servovalve assembly) versus, along a y-axis 172, pressure within the servovalve assembly. A first curve 174, illustrated in dotted line, has a first slope 176 that represents a pressure gain of a conventional servovalve assembly. A second curve 178, illustrated in solid line, has a second slope 180 that represents a pressure gain of the servovalve 100. The slope of a pressure versus current input plot indicates the pressure gain for a particular servovalve assembly. Typically, the steeper the slope of a pressure versus input current curve, the higher the relative pressure gain in the associated servovalve assembly.

As shown in FIG. 4, the slope 180 of the curve 178 for the servovalve assembly 100 is relatively steeper than the slope 176 of the curve 174 for the conventional servovalve assembly. As indicated above, the configuration of the sleeve assembly 102 minimizes cross-port leakage within the servovalve assembly 100, thereby minimizing decreases in pressure gain between the fluid source 110 and the fluid motor 112. The configuration of the sleeve assembly 102, therefore, provides an increased pressure gain at the fluid motor 112 when operating under load, for example, compared to a conventional servovalve assembly.

The curve 178 associated with the servovalve assembly 100 also indicates the ability for the sleeve assembly 102 to maintain a relatively constant pressure gain between the fluid source 110 and the fluid motor 112 (e.g., as measured at the metering apertures 122) during operation. As indicated by the curve 178, the sleeve assembly 102 provides an approximate 30% pressure gain within the servovalve 100 for every approximate 1% increase in a current of the control signal input to the servovalve 100. For example, during operation, an increase in the current of the control signal from the controller 117 causes the motor 116 to increase a torque on the connector 118, thereby causing the spool 106 to displace within the sleeve 104. By maintaining a relatively constant pressure gain between the fluid source 110 and the fluid motor 112 during operation, the sleeve assembly 102 provides relative accuracy in positioning the load 150 coupled to the fluid motor 112.

In one arrangement, the sleeve assembly 102 provides a pressure gain within the servovalve of approximately 30% for each approximately 1% increase in a current of a control signal input to the servovalve for a fluid flowing from a fluid source 110 at a flow rate of less than approximately 0.8 gallons per minute and at a pressure differential of less than approximately 300 pounds per square inch. For example, in conventional servovalve assemblies, cross-port leakage reduces a pressure gain between a fluid source and a fluid motor. Such cross-port leakage within the conventional servovalve assembly limits the ability for the fluid source to provide fluid, such as engine fuel, at a relatively low flow rate (e.g., less than approximately 0.8 gallons per minute) and at a relatively low pressure differential (e.g., less than approximately 300 pounds per square inch). The configuration of the present sleeve assembly 102 minimizes a decrease in pressure gain between a fluid source 110 and a fluid motor 112 caused by cross-port leakage thereby allowing adequate pressure gains within the servovalve (e.g., 30% gain for each approximately 1% increase in a current) for relatively low flow rates and relatively low pressure differentials, compared to conventional servovalves.

Those skilled in the art will understand that there can be many variations made to the embodiments explained above while still achieving the same objective of those embodiments and the invention in general.

For example, as indicated above, in one configuration of the sleeve assembly 102, the width 152 of the first land 130-1 is greater than, or larger than, the width 156 of the channel 132-1 and the width 154 of the second land 130-2 is greater than, or larger than, the width 156 of the channel 132-1. Such description of the sleeve assembly 102 is by way of example only. For the four-landed spool as illustrated in FIG. 3, a width of the third land 130-3 and a width of the fourth land 130-4 is also greater than a width of the channel 132-2.

As indicated above, the servovalve assembly 100 is configured as a jet pipe servovalve. Such configuration is by way of example only. In one arrangement, the servovalve is configured as a direct drive servovalve. In such an arrangement, the motor 116 couples to the spool 106 by a shaft or connector that orients within a connector opening defined by the sleeve 104. The motor 116 is configured to receive control signals from a control signal source 117. In response to the control signals, the motor 116 rotates the connector to actuate of the spool 106 within the sleeve 104, thereby controlling flow between the fluid source 110 and the fluid motor 112.

Such variations are intended to be covered by the scope of embodiments of the invention. As such, the foregoing description of embodiments of the invention is not intended to be limiting. Rather, any limitations to the invention are presented in the following claims.

What is claimed is:

1. A servovalve assembly comprising:
   a housing defining a port;
   a sleeve assembly having:
   a sleeve coupled to the housing, the sleeve defining a bore, a first metering aperture, and a second metering aperture, the sleeve having a blocking element oriented between the first metering aperture and the second metering aperture, both the first metering aperture and the second metering aperture leading to the port defined by the housing, and
   a spool disposed within the bore defined by the sleeve, the spool having a first land and a second land, the first land and the second land defining a channel oriented between the first land and the second land; and
   a motor coupled to the housing and coupled to the spool, the motor configured to position the spool within the bore (i) in a substantially null position where the first land substantially covers the first metering aperture, the second land substantially covers the second metering aperture, and the blocking element substantially covers the channel to minimize flow of a fluid from the channel to the port and (ii) in a substantially open position where the first land and the second land allow flow of the fluid through the port.

2. The servovalve assembly of claim 1 wherein the first land defines a first land width and the channel oriented between the first land and the second land defines a channel width, the first land width being greater than the channel width and the first land width configured to overlap at least a portion of the blocking element when the motor orients the spool in a substantially null position.

3. The servovalve assembly of claim 1 wherein the second land defines a second land width and the channel oriented between the first land and the second land defines a channel width, the second land width being greater than the channel width and the second land width configured to overlap at least a portion of the blocking element when the motor orients the spool in a substantially null position.

4. The servovalve assembly of claim 1 wherein the sleeve assembly is configured to provide a pressure gain within the servovalve assembly of approximately 30% for each approximately 1% increase in a current of a control signal input to the motor.

5. The servovalve assembly of claim 1 wherein the sleeve assembly is configured to provide a pressure gain within the servovalve assembly of approximately 30% for each approximately 1% increase in a current of a control signal input to the motor for a fluid flowing from a fluid source at a flow rate of less than approximately 0.8 gallons per minute and at a pressure differential of less than approximately 300 pounds per square inch.

6. The servovalve assembly of claim 1 wherein the fluid comprises aircraft fuel.

7. The servovalve assembly of claim 1 wherein the dynamic viscosity of the fluid is less than approximately 2.0 centistokes.

8. The servovalve assembly of claim 1 wherein the motor is configured to move the spool in response to an aircraft control signal from an aircraft control signal source disposed within an aircraft.

9. A sleeve assembly comprising:
   a sleeve defining a bore, a first metering aperture, and a second metering aperture, the sleeve having a blocking element oriented between the first metering aperture and the second metering aperture, both the first metering aperture and the second metering aperture configured to lead to a port defined by a servovalve assembly; and
   a spool disposed within the bore defined by the sleeve, the spool having a first land and a second land, the first land and the second land defining a channel oriented between the first land and the second land, the spool configured to position within the bore (i) in a substantially null position where the first land substantially covers the first metering aperture, the second land substantially covers the second metering aperture, and the blocking element substantially covers the channel to minimize flow of a fluid from the channel to the port and (ii) in a substantially open position where the first land and the second land allow flow of the fluid through the port.

10. The sleeve assembly of claim 9 wherein the first land defines a first land width and the channel oriented between the first land and the second land defines a channel width, the first land width being greater than the channel width and the first land width configured to overlap at least a portion of the blocking element when the spool orients in a substantially null position.

11. The sleeve assembly of claim 9 wherein the second land defines a second land width and the channel oriented between the first land and the second land defines a channel width, the second land width being greater than the channel width and the second land width configured to overlap at least a portion of the blocking element when the spool orients in a substantially null position.

12. The sleeve assembly of claim 9 wherein the sleeve assembly is configured to provide a pressure gain within a servovalve assembly of approximately 30% for each approximate 1% increase in a current of a control signal input to a motor of the servovalve assembly.

13. The sleeve assembly of claim 9 wherein the sleeve assembly is configured to provide a pressure gain within the servovalve of approximately 30% for each approximately 1% increase in a current of a control signal input to the servovalve for a fluid flowing from a fluid source at a flow rate of less than approximately 0.8 gallons per minute and at a pressure differential of less than approximately 300 pounds per square inch.

14. The sleeve assembly of claim 9 wherein the fluid comprises aircraft fuel.

15. The sleeve assembly of claim 9 wherein the dynamic viscosity of the fluid is less than approximately 2.0 centistokes.

16. The sleeve assembly of claim 9 wherein the spool is configured to couple to a motor which moves the spool in response to an aircraft control signal from an aircraft control signal source disposed within an aircraft.

17. A method for manufacturing a servovalve assembly comprising:
forming a first metering aperture and a second metering aperture within a sleeve defining a bore, the sleeve having a blocking element oriented between the first metering aperture and the second metering aperture;
coupling the sleeve with a servovalve housing, the first metering aperture and the second metering aperture leading to a port defined by the housing;
disposing a spool within the bore defined by the sleeve, the spool having a first land and a second land, the first land and the second land defining a channel oriented between the first land and the second land; and
attaching the spool with a motor coupled to the housing, the motor configured to position the spool, within the bore, (i) in a substantially null position where the first land substantially covers the first metering aperture, the second land substantially covers the second metering aperture, and the blocking element substantially covers the channel to minimize flow of a fluid from the channel to the port and (ii) in a substantially open position where the first land and the second land allow flow of a fluid through the port.

18. The method of claim 17 further comprising:
forming the first land to define a first land width and forming the channel oriented between the first land and the second land to define a channel width, the first land width being greater than the channel width and the first land width configured to overlap at least a portion of the blocking element when the motor orients the spool in a substantially null position.

19. The method of claim 17 further comprising:
forming the second land to define a second land width and forming the channel oriented between the first land and the second land to define a channel width, the second land width being greater than the channel width and the second land width configured to overlap at least a portion of the blocking element when the motor orients the spool in a substantially null position.

20. The method of claim 17 wherein attaching the spool with the motor includes:
configuring motor to move the spool in response to an aircraft control signal from an aircraft control signal source disposed within an aircraft.

* * * * *